US012797827B2

(12) United States Patent
Yang et al.

(10) Patent No.: US 12,797,827 B2
(45) Date of Patent: Nov. 17, 2026

(54) PREPARATION METHOD FOR HIGH-ADSORPTION-CAPACITY GRANULAR TITANIUM-BASED LITHIUM ION SIEVE ADSORBENT

(71) Applicants: CHENGDU CHEMPHYS CHEMICAL INDUSTRY CO LTD, Chengdu (CN); SINOLITHIUM MATERIALS LIMITED, Hong Kong (CN)

(72) Inventors: Jinfeng Yang, Chengdu (CN); Qiang Meng, Chengdu (CN); Wenjun Ban, Chengdu (CN); Rongfu Cai, Chengdu (CN); Yihua Dai, Chengdu (CN)

(73) Assignees: CHENGDU CHEMPHYS CHEMICAL INDUSTRY CO LTD, Chengdu (CN); SINOLITHIUM MATERIALS LIMITED, Hong Kong (CN)

( * ) Notice: Subject to any disclaimer, the term of this patent is extended or adjusted under 35 U.S.C. 154(b) by 441 days.

(21) Appl. No.: 18/578,347

(22) PCT Filed: Nov. 2, 2022

(86) PCT No.: PCT/CN2022/129167
§ 371 (c)(1),
(2) Date: Jan. 11, 2024

(87) PCT Pub. No.: WO2023/083065
PCT Pub. Date: May 19, 2023

(65) Prior Publication Data
US 2025/0262609 A1 Aug. 21, 2025

(30) Foreign Application Priority Data
Nov. 15, 2021 (CN) ........................ 202111345745.8

(51) Int. Cl.
*B01J 20/30* (2006.01)
*B01J 20/06* (2006.01)
(Continued)

(52) U.S. Cl.
CPC .......... *B01J 20/3078* (2013.01); *B01J 20/06* (2013.01); *B01J 20/28026* (2013.01);
(Continued)

(58) Field of Classification Search
CPC .. B01J 20/3078; B01J 20/06; B01J 20/28026; B01J 20/3021; B01J 20/3028; B01J 20/3042; B01J 20/3064; B01J 20/3071
See application file for complete search history.

(56) References Cited

U.S. PATENT DOCUMENTS

| | | | | |
|---|---|---|---|---|
| 2024/0307862 | A1* | 9/2024 | Meng | C01G 23/003 |
| 2025/0099940 | A1* | 3/2025 | Yang | C02F 1/288 |
| 2025/0108357 | A1* | 4/2025 | Wang | B01J 20/3064 |

FOREIGN PATENT DOCUMENTS

| | | | |
|---|---|---|---|
| CN | 102631897 | A | 8/2012 |
| CN | 109012600 | A | 12/2018 |

(Continued)

OTHER PUBLICATIONS

Translation of CN 109225124A (2019).*

*Primary Examiner* — Christina A Johnson
(74) *Attorney, Agent, or Firm* — JCIPRNET

(57) ABSTRACT

A preparation method for a high-adsorption-capacity granular titanium-based lithium ion sieve adsorbent includes the following steps: step 1, preparing titanium-based lithium ion sieve precursor powder; step 2, preparing high-adsorption-capacity granular titanium-based lithium ion sieve adsorbent, which includes: 1) pretreatment of precursor powder; 2) preparing a composite adhesive; 3) doping, blending and homogenizing; 4) molding and granulating; and 5) eluting
(Continued)

and replacing. The granular adsorbent has relatively high porosity, shows good suspension property when being used for extracting lithium from salt lake brine or simulated brine, and is high in adsorption-desorption rate and high in lithium extraction activity; the lithium ion selectivity and the elution rate can reach 95% or above.

12 Claims, 3 Drawing Sheets

(51) Int. Cl.

| | |
|---|---|
| ***B01J 20/28*** | (2006.01) |
| ***C22B 3/04*** | (2006.01) |
| ***C22B 3/24*** | (2006.01) |
| ***C22B 26/12*** | (2006.01) |
| ***H01M 10/54*** | (2006.01) |

(52) U.S. Cl.
CPC ....... *B01J 20/3021* (2013.01); *B01J 20/3028* (2013.01); *B01J 20/3042* (2013.01); *B01J 20/3064* (2013.01); *B01J 20/3071* (2013.01); *C22B 3/04* (2013.01); *C22B 3/24* (2013.01); *C22B 26/12* (2013.01); *H01M 10/54* (2013.01)

(56) References Cited

FOREIGN PATENT DOCUMENTS

| | | | |
|---|---|---|---|
| CN | 109225124 | A | 1/2019 |
| CN | 110975795 | A | 4/2020 |
| CN | 112871126 | A | 6/2021 |
| CN | 112871127 | A | 6/2021 |
| CN | 114345291 | A | 4/2022 |
| JP | 2004025113 | A | 1/2004 |

* cited by examiner

PREPARATION METHOD FOR HIGH-ADSORPTION-CAPACITY GRANULAR TITANIUM-BASED LITHIUM ION SIEVE ADSORBENT

TECHNICAL FIELD

The present invention relates to the technical field of chemical new materials preparation, and particularly to a preparation method for a high-adsorption-capacity granular titanium-based lithium ion sieve adsorbent.

BACKGROUND

In the 21st century, with the popularization of computers, digital cameras, mobile phones, mobile electric tools and other electronic products, and the continuous development of new energy vehicles, lithium-ion batteries have become the largest consumer of lithium in the world.

Natural lithium resources are mainly reserved in granite type deposits and salt lake brine, seawater and geothermal water. The statistical data suggest that these resources are mainly presented in lithium-bearing brine, which accounts for about 61% of the total lithium resources, lithium ore accounts for about 34%, and the remaining 5% of lithium resources are contained in oil fields and geothermal water.

Lithium extraction by adsorption is a novel process developed in recent years for extracting lithium from salt lakes. This process is to selectively adsorb lithium ions from raw brine by using specific lithium ion sieve absorbent materials. It has high efficiency and can quickly extract lithium from brine. The overall recovery rate is about 85%, greatly improving the value and utilization of resources. It is the most competitive development direction for lithium extraction from salt lakes. At present, research experts at home and abroad are committed to synthesizing a lithium ion sieve adsorbent with stable structure, low solution loss, high adsorption capacity and fast adsorption rate. The lithium ion sieve in powder state has the advantages of large adsorption capacity and high adsorption efficiency due to its fine particle size, large specific surface area and sufficient solid liquid contact; however, industrial use has engineering problems such as difficulties in separation and scrubbing. In order to solve the problems such as difficulties in powder filtration and separation and high solution loss, it is necessary to mold and granulate the powder lithium ion sieve. After granulation, the filterability and scrubbing efficiency are greatly improved, and the solution loss of adsorbent is also greatly reduced. However, the specific surface area brought by the molding is reduced, resulting in a significant decline in the adsorption capacity, even only 20%-30% of the original lithium ion sieve powder. In order to improve the particle size and specific surface area of molded adsorbent, researchers at home and abroad have actively developed the adsorbent molding method in recent years, so as to develop a low-cost, high-efficiency, large-scale process and device.

SUMMARY

The purpose of the present invention is to provide a preparation method for a high-adsorption-capacity granular titanium-based lithium ion sieve adsorbent against the defects of the prior art. The adsorbent is a hydrophilic granular titanium-based lithium ion sieve adsorbent. The prepared granular adsorbent can efficiently and selectively identify and adsorb lithium ions in salt lake brine, lithium precipitation mother liquor, high-impurity lithium-containing solution, lithium battery recovery solution and other lithium-containing solutions. The granular adsorbent has high porosity and small specific gravity, and can be suspended and dispersed in liquid medium under small liquid impact force. The granular adsorbent can fully and effectively contact with brine or eluent, with fast adsorption-desorption rate and high lithium adsorption capacity; the granular adsorbent has high strength and toughness, good liquid impact resistance, low solution loss and long cycle service life; the molding method adopts slurry granulation to solidify in water bath, or slurry granulation to dry in vacuum atmosphere. The solvent can be recycled. The molding process is simple and environmentally controllable, and can prepare granular absorbent materials on a large scale, with high industrial application value.

To achieve the above purpose, the specific technical solution of the present invention is as follows:

A preparation method for a high-adsorption-capacity granular titanium-based lithium ion sieve adsorbent, comprising the following steps:

step 1, preparing titanium-based lithium ion sieve precursor powder by step a and step b;

a) well mixing the lithium source, titanium dioxide and dispersant by mechanical ball milling, controlling the molar ratio of Li/Ti to be 2: (1-1.2), adding high-temperature pore-forming agent and mixing well, then spray drying to obtain granulation powder, transferring the granulation powder to microwave high-temperature sintering furnace, calcining at 350-650 °C for 2-3 h, cooling to obtain titanium-based lithium ion sieve precursor powder;

or b) mixing the titanium source, lithium hydroxide and appropriate amount of water, controlling the molar ratio of Li/Ti to be 2: (1-1.2), adding 0.5-1.5 wt % hydrogen peroxide, performing stirring reaction for 3-6 h under 60-90 °C ultrasonic conditions, filtering and scrubbing in sequence, adding high-temperature pore-forming agent, mixing well, and then spray drying to obtain granulation powder, transferring the granulation powder to the microwave high-temperature sintering furnace, calcining at 300-500 °C for 2-3 h, cooling to obtain titanium-based lithium ion sieve precursor powder;

step 2, preparing a high-adsorption-capacity titanium-based lithium ion sieve adsorbent:

A) pretreatment: grinding the titanium-based lithium ion sieve precursor powder and sieving by 150-800 meshes to obtain pretreated powder; more preferably sieving by 200-400 meshes.

B) preparation of the composite adhesive: dissolving the polymer material with organic solvent, adding appropriate amount of additives thereto, and stirring under the water bath condition of 20-80 °C until completely dissolved to obtain the composite adhesive;

C) doping, blending and homogenization: mixing the powder in step A) with the composite adhesive prepared in step B), stirring at high speed and dispersing to obtain uniform slurry;

D) molding: molding by granulation—water bath solidification or granulation—vacuum drying, sieving to obtain granular titanium-based lithium adsorbent precursor;

E) elution and replacing: leaching out lithium ions from the granular titanium-based lithium adsorbent precursor in step D) with an eluent, and then washing with water to obtain the high-adsorption-capacity titanium-based lithium ion sieve adsorbent.

As a preferred implementation of the present application, the dispersant in step 1(a) is more preferably one of PEG200-PEG6000 aqueous solution, with the concentration of 1%-2 wt %, and the lithium source is more preferably lithium carbonate.

As a preferred implementation of the present application, the titanium source in step 1(a) is more preferably titanium dioxide, with a primary particle size of 10-50 nm, preferably 10 nm; the specific surface area is 60~400 $m^2/g$, preferably 300 $m^2/g$; the addition amount of the water is 20%-50 wt % of the solid mass, and the ultrasonic frequency is more preferably 20 KHZ-60 KHZ.

As a preferred implementation of the present application, the spray drying temperature in step 1 is 160-220 °C, the high-temperature pore-forming agent is one of polyethersulfone, polysulfone and polyarylsulfone, and the titanium-based lithium ion sieve precursor powder obtained is $Li_4Ti_5O_{12}$ or $Li_2TiO_3$.

As a preferred implementation of the present application, the organic solvent in step B) is any one of dimethylacetamide, N-methylpyrrolidone, dimethyl sulfoxide and dichloromethane; more preferably dimethyl acetamide or dimethyl sulfoxide.

As a preferred implementation of the present application, the polymer material in step B) is any one or a mixture of polyarylsulfone, polysulfone, polyethersulfone, sulfonated polysulfone, polyphenylene sulfone, polyimide, chlorinated polyvinyl chloride and polyvinyl butyral, and the mass concentration of the polymer material dissolved in organic solvent is 5%-20%.

The additive in step B) is any one or a mixture of polyvinyl alcohol, glycerin, polysulfone, polyarylsulfone, citric acid, glucose, chitosan, oxalic acid, acetic acid, PVP, PEG6000, lithium carbonate, sodium bicarbonate, potassium carbonate, and potassium bicarbonate; the amount of the additive is 0-3 wt % of the mass of the high-adsorption-capacity titanium-based lithium ion sieve adsorbent.

As a preferred implementation of the present application, in step C), after the powder is mixed with the composite adhesive, the solid content is controlled to be 30-60 wt %; the rotation speed of the high-speed stirring for dispersion is 1,100-1,800 r/min, and the dispersed slurry is sieved by 80-400 meshes.

As a preferred implementation of the present application, the coagulation bath used for molding by the water bath solidification in step D) is any one of water and inorganic salt solution, and the mass concentration of inorganic salt solution is 0.5%-5%. The granulation in molding by the granulation—water bath solidification includes slurry electrostatic spray granulation, slurry brush-stipple spray granulation and disk centrifugal granulation, and the solid content in the slurry is controlled to be 35%-45%.

As a preferred implementation of the present application, the slurry used for electrostatic spray granulation is sieved by 250-400 meshes, with the nozzle aperture of 0.7-1.1 mm, the electrostatic pressure of 3 KV-6 KV, and the distance of 0.3-1 m from the nozzle to receptor fluid; the slurry used for brush-stipple spray granulation is sieved by 150-300 meshes, with the nozzle aperture of 0.9-1.2 mm and the distance of 0.5-1.2 m from the nozzle to receptor fluid; the slurry used for disk centrifugal granulation is sieved by 80-150 meshes, with the disk diameter of 40 mm-80 mm, disk speed of 800 r/min-1200 r/min and the distance of 0.5-1.5 m from the disk to receptor fluid.

As a preferred implementation of the present application, during molding by granulation—water bath solidification, the slurry is sprayed into the water bath through the electrostatic brush-stipple spray device to solidify into rod-like, spherical or irregular particles, or the slurry is dropped into the high-speed disk device, the slurry is dispersed under the effect of centrifugal force, and sprayed into the water bath to solidify into spherical, ellipsoidal or irregular particles; the spherical, rod-like or irregular granular adsorbent precursor can be prepared by soaking in the coagulation bath for 0.5-2 h.

As a preferred implementation of the present application, molding by granulation—vacuum drying needs to first control the solid content in the slurry to be 45-60 wt %; the liquid drop of slurry is dried and molded by spray or disk centrifugal throwing out in a vacuum atmosphere at 40 °C-80 °C, with the vacuum degree range being more preferably 0.05 Mpa-0.08 Mpa, and particles with particle size of 0.3-2 mm are sieved as the granular adsorbent precursor.

As a preferred implementation of the present application, the eluent in step E) is any one of sulfuric acid, nitric acid, hydrochloric acid, acetic acid, citric acid, oxalic acid and $Na_2S_2O_6$.

As a preferred implementation of the present application, the high-adsorption-capacity granular titanium-based lithium ion sieve adsorbent with excellent performance can be prepared through the technical solution of the present invention. The average particle size of the granular adsorbent can be preferably controlled to be 0.3-2 mm, and the bulk density is 0.35-0.45 $g/cm^3$.

The main solution of the present invention and further alternatives thereof may be combined freely to form a plurality of solutions, all of which may be adopted and claimed in the present invention; and each alternative can be arbitrarily combined with other compatible alternatives according to the present invention. Multiple combinations are clear to those skilled in the art based on the prior art and the common general knowledge after understanding the solutions of the present invention, all of which are technical solutions to be protected by the present invention and are not exhaustive here.

Compared with the prior art, the present invention has the following beneficial effects:

(1) The prepared granular titanium-based lithium ion sieve adsorbent has good hydrophilicity, high porosity, fast adsorption-desorption rate, and high lithium adsorption capacity. It can identify and adsorb lithium in salt lake brine, lithium precipitation mother liquor, high-purity lithium-containing solution, lithium battery recovery solution, and other lithium-containing solutions with high selectivity. The adsorbent has good erosion resistance, low solution loss, and long cycle life in use.

(2) The adsorbent has simple preparation process, and the molding method adopts slurry granulation—water bath solidification, or slurry granulation—vacuum drying. The solvent can be recycled, and the molding process is simple and environmentally controllable, wherein the disk centrifugal granulation technology is novel, and can prepare granular absorbent materials on a large scale, with high industrial application value.

(3) The prepared granular adsorbent has high porosity, small specific gravity and good suspension and dispersion performance. In the application of lithium extraction by adsorption, the adsorbents with different particle size ranges can be suspended and dispersed in brine or eluate under low impact, which increases the ion exchange rate on the adsorbent surface and reduces the energy consumption of the adsorbent in actual use.

DETAILED DESCRIPTION OF THE PREFERRED EMBODIMENTS

Figure 1:
FIG. 1 shows a prepared spherical titanium-based lithium ion sieve particle adsorbent.
Figure 2:
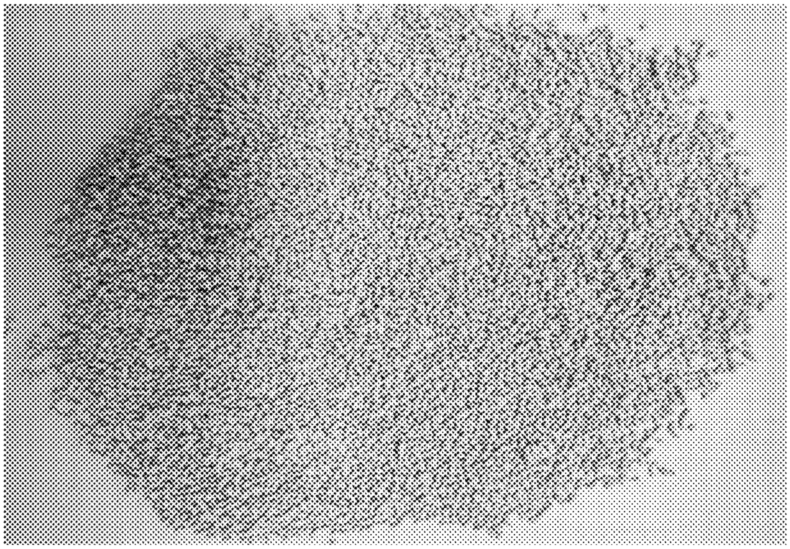
FIG. 2 shows a prepared rod-like titanium-based lithium ion sieve particle adsorbent.
Figure 3:
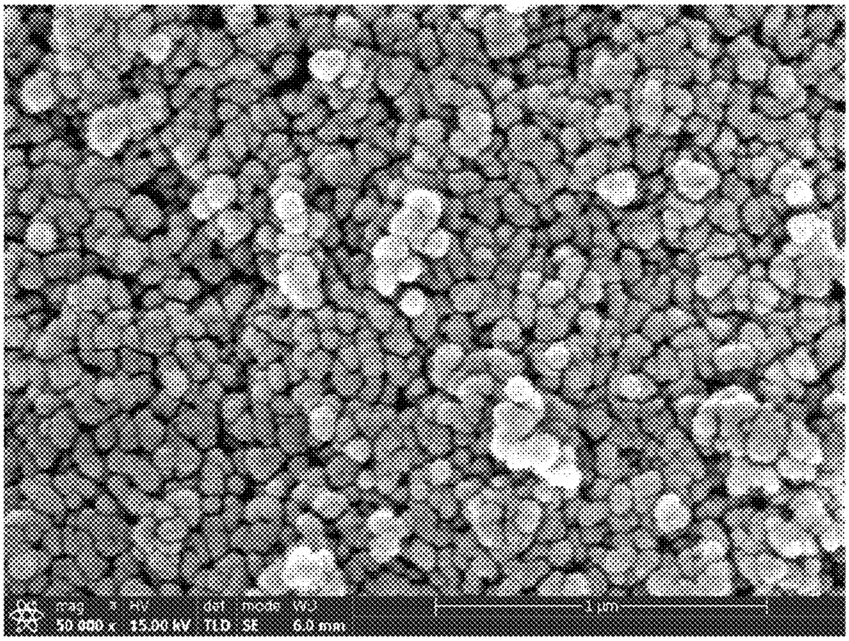
FIG. 3 is an SEM micrograph of the prepared titanium-based lithium ion sieve powder.
Figure 4:
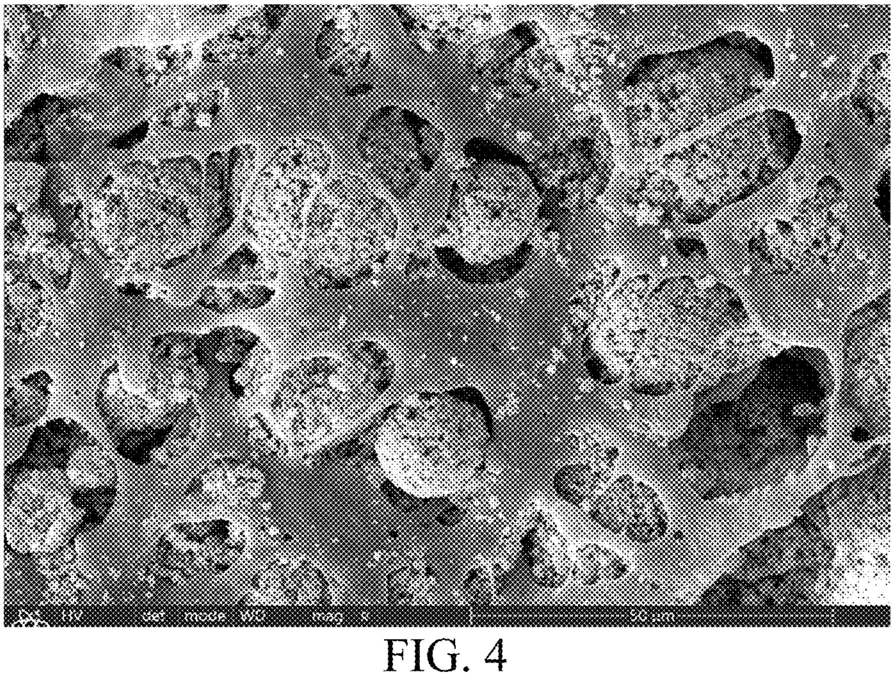
FIG. 4 is an SEM micrograph of the cross section of a single titanium-based lithium absorbent material.
Figure 5:
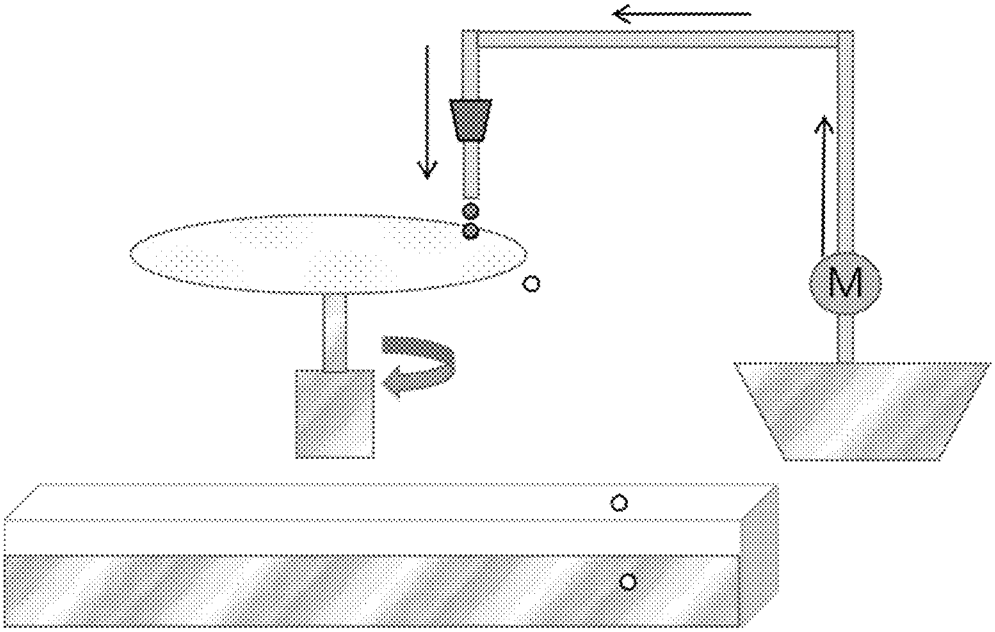
FIG. 5 is a disk centrifugal granulation device.

A preparation method for a high-adsorption-capacity granular titanium-based lithium ion sieve adsorbent, comprising the following steps:

step 1, preparing titanium-based lithium ion sieve precursor powder;

a) well mixing the lithium source, titanium dioxide and dispersant by mechanical ball milling, controlling the molar ratio of Li/Ti to be 2: (1-1.2), adding high-temperature pore-forming agent and mixing, then spray drying to obtain granulation powder, transferring the granulation powder to microwave high-temperature sintering furnace, calcining at 350-650 °C for 2-3 h, cooling to obtain titanium-based lithium ion sieve precursor powder;

or b) mixing the titanium source, lithium hydroxide and appropriate amount of water, controlling the molar ratio of Li/Ti to be 2: (1-1.2), adding 0.5-1.5 wt % hydrogen peroxide, performing stirring reaction for 3-6 h under 60-90 °C ultrasonic conditions, filtering and scrubbing in sequence, adding high-temperature pore-forming agent, mixing well, and then spray drying to obtain granulation powder, transferring the granulation powder to the microwave high-temperature sintering furnace, calcining at 300-500 °C for 2-3 h, cooling to obtain titanium-based lithium ion sieve precursor powder;

step 2, preparing a high-adsorption-capacity titanium-based lithium ion sieve adsorbent:

A) pretreatment: grinding the titanium-based lithium ion sieve precursor powder and sieving by 150-800 meshes to obtain powder; more preferably sieving by 200-400 meshes.

B) preparation of the composite adhesive: dissolving the polymer material with organic solvent, adding appropriate amount of additives thereto, and stirring under the water bath condition of 20-80 °C until completely dissolved to obtain the composite adhesive;

C) doping, blending and homogenization: mixing and dispersing the powder in step A) with the composite adhesive prepared in step B) to obtain uniform slurry;

D) molding: molding by granulation—water bath solidification or granulation—vacuum drying, sieving to obtain granular titanium-based lithium adsorbent precursor;

E) elution and replacing: leaching out lithium ions from the titanium-based lithium adsorbent precursor in step D) with an eluent, and then washing with water to obtain the high-adsorption-capacity titanium-based lithium ion sieve adsorbent.

Preferably, the dispersant in step 1(a) is one of glucose, citric acid or PEG200-PEG6000 aqueous solution, with the concentration of 1%-2 wt %, and the lithium source is more preferably lithium carbonate.

Preferably, the titanium source in step 1(b) is more preferably titanium dioxide, with a primary particle size of 10-50 nm, preferably 10 nm; the specific surface area is 60~400 $m^2/g$, preferably 300 $m^2/g$; the addition amount of the water is 20-50% of the solid mass, and the ultrasonic frequency is more preferably 20 KHZ-60 KHZ;

Preferably, the spray drying temperature in step 1 is 160-200 °C, and the pore-forming agent is one of polyethersulfone, polysulfone and polyarylsulfone; the microwave sintering temperature in step 1(a) is more preferably 450-550 °C, and the microwave sintering temperature in step 1(b) is more preferably 350-450 °C; the metatitanic acid powder obtained above is $Li_4Ti_5O_{12}$ or $Li_2TiO_3$;

Preferably, the organic solvent in step B) is any one of dimethylacetamide, N-methylpyrrolidone, dimethyl sulfoxide, ethyl acetate and dichloromethane.

Preferably, the polymer material in step B is any one or a mixture of polyarylsulfone, polysulfone, polyethersulfone, sulfonated polysulfone, polyphenylene sulfone, polyimide, chlorinated polyvinyl chloride and polyvinylidene fluoride, and the mass concentration of the polymer material dissolved in organic solvent is 5%-20%.

Preferably, the additive in step B) is any one or a mixture of polyvinyl alcohol, polysulfone, polyarylsulfone, citric acid, glucose, chitosan, oxalic acid, acetic acid, PVP, PEG200-PEG6000, lithium carbonate, sodium bicarbonate, potassium carbonate, and potassium bicarbonate; the amount of the additive is 0-3 wt % of the mass of the high-adsorption-capacity titanium-based lithium ion sieve adsorbent.

Preferably, in step C), after the powder is mixed with the composite adhesive, the solid content is controlled to be more preferably 35-45 wt %; the rotation speed of the high-speed stirring for dispersion is 1,100-1,800 r/min, and the dispersed slurry is sieved by 80-400 meshes.

Preferably, the coagulation bath used for molding by the granulation—water bath solidification in step D) is any one of water and inorganic salt solution, and the mass concentration of inorganic salt solution is 0.5%-5%.

Preferably, the granulation molded by granulation—water bath solidification includes slurry electrostatic spray granulation, slurry brush-stipple spray granulation and disk centrifugal granulation, and the solid content in the slurry is controlled to be 35%-45%; the slurry is sprayed into the water bath through the electrostatic brush-stipple spray device to solidify into rod-like, spherical or irregular particles, or the slurry is dropped into the high-speed disk device, the slurry is dispersed under the effect of centrifugal force, sprayed into the water bath to solidify into spherical, ellipsoidal or irregular particles, and soaked in the solidification bath for 0.5-2 h for molding; the spherical, rod-like or irregular granular adsorbent precursor material can be prepared.

Preferably, the slurry used for electrostatic spray granulation is sieved by 250-400 meshes, with the nozzle aperture of 0.7-1.1 mm, the electrostatic pressure of 3 KV-6 KV, and the distance of 0.3-1 m from the nozzle to receptor fluid; the slurry used for brush-stipple spray granulation is sieved by 150-300 meshes, with the nozzle aperture of 0.9-1.2 mm and the distance of 0.5-1.2 m from the nozzle to receptor fluid; the slurry used for disk centrifugal granulation is sieved by 80-150 meshes, with the disk diameter of 40 mm-80 mm, disk speed of 800 r/min-1200 r/min and the distance of 0.5-1.5 m from the disk to receptor fluid;

Preferably, molding by granulation—vacuum drying solidification needs to first control the solid content in the slurry to be 45-60%; the vacuum degree range is 0.03 Mpa-0.09 Mpa, the drying temperature is 40-80 °C, and the sieving particle size is 0.3-2 mm.

Preferably, the eluent used for leaching the granular lithium ion precursor in step E) is any one or a combination of sulfuric acid, hydrochloric acid or $Na_2S_2O_6$.

A high-adsorption-capacity granular titanium-based lithium ion sieve adsorbent is prepared by the aforementioned method. The high-adsorption-capacity granular titanium-based lithium ion sieve adsorbent with excellent performance is prepared by the foregoing method of the present invention.

The particle size of the granular adsorbent can be preferably controlled to be 0.3-2 mm, and the bulk density is 0.35-0.45 g/cm$^3$.

The implementation of the present invention is described below through specific examples, and those skilled in the art can easily understand other advantages and effects of the present invention from the contents disclosed in the Description. The present invention can also be implemented or applied in other different specific implementations, and various details in the Description can also be modified or changed based on different views and applications without departing from the spirit of the present invention. It should be noted that, the following embodiments and the features in the embodiments may be combined with each other in a non-conflicting situation.

It should be noted that, the technical solutions of the embodiments of the present invention will be described clearly and completely as follows in combination with the figures of these embodiments for clear understanding of the objects, technical solutions and advantages of the present invention. Apparently, the embodiments described herein are only some, but not all of the embodiments of the present invention. Generally, the components in the embodiments of the present invention described and shown in the figures herein may be arranged and designed in various configurations.

For data analysis in the following examples, K, Ca, Na, Mg and B are analyzed by ICP spectrometry, Cl is analyzed by spectrophotometry colorimetry, Li and Ti are determined by atomic absorption spectrometry, and sulfate radical is determined by barium sulfate turbidimetry (GB 13580.6-92). Unless particularly stated elsewhere, % recited in this application shows the mass percentage, namely wt %.

Embodiment 1

A preparation method for a high-adsorption-capacity granular titanium-based lithium ion sieve adsorbent, comprising the following steps:

(1) Preparation of Lithium Metatitanate Powder;

dispersing and uniformly mixing 19.7 kg of titanium dioxide, 17.4 kg of battery grade lithium carbonate, 0.1 kg of 1.5 wt % PEG6000 aqueous solution at high speed, and then mechanically ball milling to control the particle size D50=550~850 nm; next, adding polyethersulfone powder to mix for spray pre-granulation, setting the spray pre-granulation temperature at 200 °C; finally, calcining at 600 °C in a microwave oven to obtain the lithium ion sieve precursor $Li_2TiO_3$;

(2) PES-$H_2TiO_3$ Rod-Like Adsorbent

S1 pretreatment: grinding the lithium metatitanate precursor, and then sieving by 250 meshes to obtain lithium metatitanate lithium ion precursor;

S2 preparation of 15% PES sol: taking 2.7 kg of granular PES (polyethersulfone) and adding it to 15 L of dimethyl acetamide, and stirring it continuously in a water bath at 50 °C for 2 h until it is completely dissolved, to obtain 15% PES sol (%—the proportion of polymer material in the solvent);

S3 doping, blending and homogenizing: taking 9 kg of $Li_2TiO_3$ powder pretreated in step S1 and all 15% PES sol obtained in step S2 and mixing them evenly at the speed of 1800 r/min by mechanical stirring to obtain the blended slurry by ultrasonic for 15 min;

S4 molding: first sieving the blended slurry by 250 meshes, then extruding and granulating it through an electrostatic solution spray device, receiving and solidifying it in a water bath, adjusting the voltage to 6 kv, and the receiving distance to 0.5 m to obtain spherical lithium ion sieve precursor materials; sieving 0.3-2 mm particles as molding precursors, with a yield of ≥95% (the measured particle size distribution is 0.3-0.5 mm accounting for 20%, 0.5-0.7 mm accounting for 20%, 0.7-0.9 accounting for 30%, 0.9-1.1 mm accounting for 20%, 1.1-1.5 mm accounting for 5%, and 1.5-2 mm accounting for 5%). The average bulk density is 0.43 g/cm$^3$, and the absorbent material of this proportion can be suspended and dispersed in the simulated brine 1 at 0.15 By/min bubbling flow rate, and suspended and dispersed in the eluate at the air-blowing flow rate of 0.35 By/min;

S5 replacing: leaching out lithium ions from the granular precursor obtained in step S4 with 0.4 M HCl, and then washing to obtain PES-HTO type adsorbent; the PES-HTO adsorbent prepared in this embodiment is used to perform dynamic adsorption test on the adsorption columns of simulated brine 1 and simulated brine 2 respectively. The specific evaluation results are as follows:

Simulated Brine 1:

| pH | Density g/cm$^3$ | Temperature ° C. | $Li^+$ | $Na^+$ | $K^+$ | $Ca^{2+}$ | $Mg^{2+}$ | Cl− | SO42− | $B^{3-}$ |
|---|---|---|---|---|---|---|---|---|---|---|
| | | | mg/L | | | | | | | |
| 9.5 | 1.181 | 20 | 680 | 99000 | 9800 | 997 | 990 | 169 | 6600 | 460 |

Simulated Brine 2:

| PH | Density g/cm³ | Temperature ° C. | $Li^+$ | $Na^+$ | $K^+$ | $Mg^{2+}$ | $Ca^{2+}$ mg/L | $Cl^-$ | $SO_4^{2-}$ | $B^{3-}$ |
|---|---|---|---|---|---|---|---|---|---|---|
| 7.26 | 1.2676 | 25 | 1772 | 7695 | 803 | 74006 | 16 | 246498 | 11106 | 1713 |

The lithium metatitanate ($Li_2TiO_3$) powder is prepared by dynamic elution of 0.4 mol/L hydrochloric acid for 20 h to obtain lithium ion sieve HTO powder. The evaluation results of Li adsorption-desorption performance are as follows:

| Brine | 0.5 h lithium adsorption capacity | Li recovery rate | 1 h elution rate | Solution loss |
|---|---|---|---|---|
| Simulated brine 1 | 18.5 mg/g | 95.1% | 95.1% | 0.05% |
| Simulated brine 2 | 28.1 mg/g | 91.3% | 97.1% | 0.05% |

The evaluation results of adsorption-desorption performance of molded PES-HTO:

| Brine | 0.5 h lithium adsorption capacity | Li recovery rate | 1 h elution rate | Solution loss |
|---|---|---|---|---|
| Simulated brine 1 | 7.5 mg/g | 95.1% | 95.1% | 0.03% |
| Simulated brine 2 | 15 mg/g | 91.3% | 97.1% | 0.03% |

Embodiment 2

(1) Preparation of Lithium Metatitanate Powder;

taking 40 kg of titanium dioxide and 10 kg of water to mix and grind into uniform slurry, adding 10.5 kg solid lithium hydroxide, mixing and stirring evenly; heating to 60 °C at the ultrasonic frequency of 40 HZ, and perform the stirring reaction for 6 h under normal pressure; adding hydrogen peroxide drop by drop during the reaction process (about 100 mL of 30% hydrogen peroxide in total); after the reaction, filtering and scrubbing the titanium base lithium ion sieve powder, and returning the filtrate to slurry mixing for recycling; slurry beating, adding 0.1 kg polymer pore-forming agent polyethersulfone, mixing evenly, spray pre-granulating, calcining at 450 °C in air atmosphere for 3 h, cooling to room temperature to obtain lithium metatitanate ion sieve $Li_2TiO_3$.

(2) PES-$H_2TiO_3$ Rod-Like Adsorbent

The preparation process of PES-$H_2TiO_3$ rod-like adsorbent is the same as that of Embodiment 1, but the difference is that the granulation is to use a disk centrifugal device. The slurry is sieved by 80 meshes, and the diameter of the disk is 60 mm; the rotation speed of the disk is controlled at 950 r/min; the distance from the receptor fluid is 0.5 m, and the receptor coagulation bath is 1.5 wt % sodium bisulfate aqueous solution, so that 0.3-2 mm spherical adsorbent (PES-$H_2TiO_3$) is prepared and sieved, with a yield of ≥95% (the measured particle size distribution is 0.3-0.5 mm accounting for 20%, 0.5-0.7 mm accounting for 20%, 0.7-0.9 accounting for 30%, 0.9-1.1 mm accounting for 20%, 1.1-1.5 mm accounting for 5%, and 1.5-2 mm accounting for 5%). The average bulk density is 0.44 g/cm3, and the absorbent material of this proportion can be suspended and dispersed in the simulated brine 1 at 0.2 Bv/min bubbling flow rate, and suspended and dispersed in the eluate at the air-blowing flow rate of 0.4 Bv/min.

The granular adsorbent prepared in the present embodiment is subjected to columnar dynamic adsorption test, and the lithium extraction is evaluated by simulation 1 and 2 respectively;

The lithium metatitanate ($Li_2TiO_3$) powder prepared in the present embodiment is dynamically eluted with 0.4 mol/L hydrochloric acid for 20 h to obtain lithium ion sieve HTO powder, and the lithium extraction is evaluated by simulation 1 and 2 respectively;

The evaluation results of adsorption-desorption performance of prepared HTO powder:

| Brine | 0.5 h lithium adsorption capacity | Li recovery rate | 1 h elution rate | Solution loss |
|---|---|---|---|---|
| Simulated brine 1 | 20.5 mg/g | 95.1% | 95.1% | 0.05% |
| Simulated brine 2 | 30.1 mg/g | 95.3% | 97.1% | 0.05% |

The evaluation results of adsorption-desorption performance of molded PES-HTO:

| Brine | 0.5 h lithium adsorption capacity | Li recovery rate | 1 h elution rate | Solution loss |
|---|---|---|---|---|
| Simulated brine 1 | 9 mg/g | 97.1% | 98.1% | <0.02% |
| Simulated brine 2 | 18 mg/g | 97.3% | 96.1% | <0.02% |

Embodiment 3

The preparation method for the adsorbent is basically the same as that of Embodiment 2, but the difference only lies in step S2: taking 2.7 kg of granular PES (polyethersulfone) and adding it to 15 L of dimethyl acetamide, then adding the additive PEG6000 (accounting 2.5% of the molded adsorbent), and stirring it continuously in a water bath at 50 °C for 2 h until it is completely dissolved, to obtain 15% PES sol (%—the proportion of polymer material in the solvent).

PES-PEG-$H_2TiO_3$ Rod-Like Adsorbent

The granular lithium ion sieve PES-PEG-HTO prepared in the present embodiment is used for columnar dynamic adsorption test. The brine used in the present embodiment is the same as that in Embodiment 1, and the test results are as follows:

| Brine | 0.5 h lithium adsorption capacity | Li recovery rate | 1 h elution rate | Solution loss |
|---|---|---|---|---|
| Simulated brine 1 | 12.5 mg/g | 97.1% | 98.1% | 0.01% |
| Simulated brine 2 | 20.5 mg/g | 97.3% | 96.1% | 0.01% |

Comparative Example 1

The preparation method for the adsorbent is basically the same as that of Embodiment 3, but the difference is that the PES is replaced with polymer material PVDF (polyvinylidene fluoride) as the molding substrate to prepare PVDF-$H_2TiO_3$ composite adsorbent.

Comparative Example 2

The preparation method for the adsorbent is basically the same as that of Embodiment 3, but the difference is that the PES is replaced with polymer material PVDF (polyvinylidene fluoride) as the molding substrate to prepare PVDF-$H_2TiO_3$ composite adsorbent. The adsorbent obtained in comparative example 1 and comparative example 2 is subjected to columnar dynamic adsorption test under the same test conditions as that in Embodiment 1. The test results are as follows:

| | 0.5 h lithium adsorption capacity | 1 h elution rate | Quality loss |
|---|---|---|---|
| Comparative example 1 | 13.5 mg/g | 71.1% | <0.005% |
| Comparative example 2 | 5.6 mg/g | 77.1% | <0.005% |

It can be seen from the above table that the elution performances of PVDF-$H_2TiO_3$ and PTFE-$H_2TiO_3$ composite adsorbents obtained in comparative example 1 and comparative example 2 are poor.

Embodiment 4

The preparation method for the adsorbent is basically the same as that of Embodiment 2, but the difference only lies in step S2: taking 2.7 kg of granular PES (polyethersulfone) and adding it to 15 L of dichloromethane, then adding the additive PEG6000 (accounting 2.5% of the molded adsorbent), and stirring it continuously at the normal temperature for 2 h until it is completely dissolved, to obtain 15% PES sol (%—the proportion of polymer material in the solvent). The blended slurry is sieved by 300 meshes, and is granulated through a vacuum spray device, with the vacuum degree of 0.06 MPa, and the temperature controlled at 25 °C Dichloromethane is recovered through a vacuum condensation system. The 0.3-2 mm rod-like adsorbent (PES-$H_2TiO_3$) is obtained by sieving, with an average bulk density of 0.43 g/$cm^3$. The specific test results of the absorbent material are as follows:

The granular lithium ion sieve PES-PEG-HTO prepared in the present embodiment is used for columnar dynamic adsorption test. The brine used in the present embodiment is the same as that in Embodiment 1, and the test results are as follows:

| Brine | 0.5 h lithium adsorption capacity | Li recovery rate | 1 h elution rate | Solution loss |
|---|---|---|---|---|
| Simulated brine 1 | 9.5 mg/g | 97.1% | 98.1% | 0.01% |
| Simulated brine 2 | 18.5 mg/g | 97.3% | 96.1% | 0.01% |

Experiment 1: Test the Performance of the Adsorbent Prepared Under Different Conditions The preparation method is the same as that in Embodiment 3, but the difference only lies in that the solvent, polymer material, additive, molding method and the shape of the obtained adsorbent are replaced according to the following table. Embodiments 5-29 are obtained respectively. The specific differences are as follows:

| Embodiment | Solvent | Polymer material | Additive | Molding method | Adsorbent shape |
|---|---|---|---|---|---|
| Embodiment 5 | DMAC | PES (polyethersulfone) | PEG6000 | Electrostatic spray granulation + water bath solidification | Rod-like |
| Embodiment 6 | DMAC | PES | PEG6000 | Brush-stipple spray granulation + water bath solidification | Rod-like |
| Embodiment 7 | DMAC | PES | PEG6000 | Disk centrifugal granulation + water bath solidification | Spherical |
| Embodiment 8 | DMAC | PES | PVP | Electrostatic spray granulation + water bath solidification | Rod-like |
| Embodiment 9 | DMAC | PES | Glucose | Electrostatic spray granulation + water bath solidification | Rod-like |
| Embodiment 10 | DMAC | PES | Citric acid | Electrostatic spray granulation + water bath solidification | Rod-like |
| Embodiment 11 | DMAC | PES | Chitosan | Electrostatic spray granulation + water bath solidification | Rod-like |
| Embodiment 12 | DMAC | PES | Glycerin | Electrostatic spray granulation + water bath solidification | Rod-like |
| Embodiment 13 | DMAC | PES | Polyvinyl alcohol | Electrostatic spray granulation + water bath solidification | Rod-like |
| Embodiment 14 | DMSO | PES | Polyvinyl alcohol | Electrostatic spray granulation + water bath solidification | Rod-like |
| Embodiment 15 | DMAC | PSU (polysulfone) | Polyvinyl alcohol | Electrostatic spray granulation + water bath solidification | Rod-like |

-continued

| Embodiment | Solvent | Polymer material | Additive | Molding method | Adsorbent shape |
|---|---|---|---|---|---|
| Embodiment 16 | DMAC | PASF (polyarylsulfone) | Polyvinyl alcohol | Electrostatic spray granulation + water bath solidification | Rod-like |
| Embodiment 17 | DMAC | PASF (polyarylsulfone) | Polyvinyl alcohol | Disk centrifugal granulation + vacuum drying solidification | Rod-like |
| Embodiment 18 | DMAC | C-PVC (chlorinated polyvinyl chloride) | Polyvinyl alcohol | Electrostatic spray granulation + water bath solidification | Rod-like |
| Embodiment 19 | DMSO | C-PVC | Polyvinyl alcohol | Electrostatic spray granulation + water bath solidification | Rod-like |
| Embodiment 20 | DMAC | PES-PSU(1:1) | Polyvinyl alcohol | Electrostatic spray granulation + water bath solidification | Rod-like |
| Embodiment 21 | DMSO | PES-PSU(1:1) | Polyvinyl alcohol | Centrifugal disk granulation + water bath solidification | Spherical |
| Embodiment 22 | DMSO | Polyimide | Polyvinyl alcohol | Electrostatic spray granulation + water bath solidification | Spherical |
| Embodiment 23 | DMAC | PASF-C-PVC(1:1) | Polyvinyl alcohol | Centrifugal disk granulation + water bath solidification | Ellipsoidal |
| Embodiment 24 | DMAC | PES-C-PVC(1:1) | Polyvinyl alcohol | Centrifugal disk granulation + water bath solidification | Ellipsoidal |
| Embodiment 25 | DMAC | C-PVC | PASF | Centrifugal disk granulation + water bath solidification | Ellipsoidal |
| Embodiment 26 | DMAC | C-PVC | PES | Electrostatic spray granulation + water bath solidification | Ellipsoidal |
| Embodiment 27 | DMAC | C-PVC | Glycerin | Electrostatic spray granulation + water bath solidification | Spherical |
| Embodiment 28 | DMAC | PASF (polyarylsulfone) | Glycerin | Centrifugal disk granulation + water bath solidification | Spherical |
| Embodiment 29 | DMAC | PVB (polyvinyl butyral) | Glycerin | Centrifugal disk granulation + water bath solidification | Spherical |

The adsorbent obtained in Embodiments 5-29 is subjected to columnar dynamic adsorption test. The brine under the adsorption test has the same indicators as the simulated brine 2 in Embodiment 1. The experimental test results are as follows:

| Embodiment | 0.5 h Li adsorption capacity (mg/g) | Saturated Li adsorption capacity (mg/g) | Li selectivity | Li elution rate | Adsorbent Ti loss |
|---|---|---|---|---|---|
| Embodiment 5 | 17.7 | 36.8 | 95.1% | 94.7% | 0.010% |
| Embodiment 6 | 18.5 | 40.6 | 95.3% | 94.5% | 0.011% |
| Embodiment 7 | 17.6 | 38.2 | 95.7% | 91.5% | 0.013% |
| Embodiment 8 | 17.1 | 35.3 | 95.3% | 93.3% | 0.011% |
| Embodiment 9 | 17.8 | 37.1 | 96.1% | 93.1% | 0.011% |
| Embodiment 10 | 18.1 | 36.9 | 95.1% | 92.7% | 0.011% |
| Embodiment 11 | 13.3 | 33.1 | 91.5% | 96.8% | 0.22% |
| Embodiment 12 | 17.3 | 40.1 | 96.7% | 91.5% | 0.05% |

-continued

| Embodiment | 0.5 h Li adsorption capacity (mg/g) | Saturated Li adsorption capacity (mg/g) | Li selectivity | Li elution rate | Adsorbent Ti loss |
|---|---|---|---|---|---|
| Embodiment 13 | 19.7 | 40.1 | 95.8% | 93.7% | 0.05% |
| Embodiment 14 | 18.5 | 39.7 | 96.2% | 92.1% | 0.12% |
| Embodiment 15 | 18.1 | 38.7 | 96.3% | 97.8% | 0.08% |
| Embodiment 16 | 17.6 | 40.5 | 98.7% | 99.8% | <0.005% |
| Embodiment 17 | 15.5 | 36.9 | 97.5% | 99.3% | <0.005% |
| Embodiment 18 | 16.8 | 38.5 | 96.6% | 95.1% | <0.005% |
| Embodiment 19 | 17.8 | 39.5 | 96.1% | 94.6% | <0.005% |
| Embodiment 20 | 19.1 | 40.3 | 97.8 | 97.8% | <0.005% |
| Embodiment 21 | 17.9 | 39.7 | 97.1 | 97.5% | <0.005% |
| Embodiment 22 | 15.8 | 38.1 | 98.1% | 95.1% | <0.005% |
| Embodiment 23 | 22.1 | 45.5 | 97.6% | 98.3% | <0.001% |

-continued

| Embodiment | 0.5 h Li adsorption capacity (mg/g) | Saturated Li adsorption capacity (mg/g) | Li selectivity | Li elution rate | Adsorbent Ti loss |
|---|---|---|---|---|---|
| Embodiment 24 | 21.5 | 45.6 | 97.6% | 96.6% | <0.005% |
| Embodiment 25 | 20.5 | 45.6 | 97.6% | 99.8% | <0.005% |
| Embodiment 26 | 25.1 | 42.3 | 96.6% | 98.15 | <0.005% |
| Embodiment 27 | 21.5 | 41.1 | 97.1% | 95.5% | <0.010% |
| Embodiment 28 | 19.8 | 38.6 | 98.1% | 99.5% | <0.005% |
| Embodiment 29 | 29.8 | 48.6 | 98.1% | 99.5% | <0.005% |

Experiment 2—Life Test

The C-PVC-PASF-HTO granular composite adsorbent prepared according to the conditions in Embodiment 23 is subjected to life test experiment, and the simulated brine is simulated for 1,000 industrial continuous one-way dynamic adsorption-desorption cycles. The brine used in the present embodiment is the same as the simulated brine 1 in Embodiment 1. The specific test results are as follows:

| Number of cycles | Li adsorption capacity | Li elution rate | Solution loss |
|---|---|---|---|
| 1 | 9.5 mg/g | 98.5% | <0.001% |
| 30 | 9.3 mg/g | 100% | <0.001% |
| 50 | 8.8 mg/g | 97.6% | <0.001% |
| 70 | 8.9 mg/g | 99.5% | <0.001% |
| 120 | 8.7 mg/g | 95.4% | <0.001% |
| 160 | 8.6 mg/g | 94.8% | <0.001% |
| 210 | 8.3 mg/g | 98.5% | <0.001% |
| 250 | 7.7 mg/g | 95.3% | <0.001% |
| 300 | 7.5 mg/g | 95.4% | <0.001% |
| 350 | 7.7 mg/g | 94.6% | <0.001% |
| 400 | 7.5 mg/g | 98.5% | <0.001% |
| 450 | 7.3 mg/g | 95.3% | <0.001% |
| 500 | 6.6 mg/g | 95.4% | <0.003% |
| 550 | 6.5 mg/g | 94.6% | <0.003% |
| 750 | 6.3 mg/g | 98.5% | <0.004% |
| 800 | 6.6 mg/g | 95.3% | <0.005% |
| 860 | 6.7 mg/g | 95.4% | <0.006% |
| 900 | 6.5 mg/g | 94.6% | <0.008% |
| 950 | 6.3 mg/g | 98.5% | <0.006% |
| 1000 | 6.1 mg/g | 95.3% | <0.008% |

Note:
After adsorption for 1 h and desorption for 2 h, the Li recovery rate is ≥95% It can be seen from the above table that the lithium adsorption capacity of the adsorbent after 1000 cycles has declined, but it still remains above 6 mg/g.

Comparative Example 3

Grinding the lithium ion sieve precursor powder prepared in Embodiment 2 and sieving it by 250 meshes, weighing 70 g of $Li_2TiO_3$, 20 g of modified acrylic water-based resin (50%) and 10 g of water, fully stirring and mixing evenly, controlling the effective proportion of powder in the molding material to 89%, extruding it into small columnar particles with a diameter of 1.5 mm by a granulator, drying it at 80 °C for 24 h to obtain the adsorbent precursor, and then soaking it in 1M HCL for 24 h to obtain the particle adsorbent.

Comparative Example 4

Grinding the lithium ion sieve precursor powder prepared in Embodiment 2 and sieving it by 250 meshes, weighing 70 g of $Li_2TiO_3$, 10 g $Fe_2O_3$ and 20 g of diatomite and mixing them; adding 20 g of epoxy resin adhesive into the mixed powder in the previous step, forming small columnar particles with a diameter of 1.5 mm through the extrusion granulator, and feeding them to the oven for drying at 80 °C for 2 h; soaking the dried particles in 1M HCl for 4 h, maintaining at 60 °C, and scrubbing to obtain a columnar lithium ion sieve particle.

The performances of the adsorbents prepared in comparative example 3 and comparative example 4 are compared with those prepared in Embodiment 24. The simulated brine 1 in Embodiment 1 is used to test (adsorbing for 1.5 h and eluting with 0.1M sulfuric acid for 1.5 h), and the porosity of the granular adsorbent is measured. The mass loss of the adsorbent under the same conditions is measured by ultrasonic vibration, and its strength is evaluated. The results are as shown in the following table:

| | Li adsorption capacity | Porosity | Elution rate | Titanium loss | Mass loss rate |
|---|---|---|---|---|---|
| Embodiment 24 | 12.5 mg/g | 79.5% | 98.1% | <0.005% | <0.02% |
| Comparative example 3 | 4.56 mg/g | 38.7% | 95.8% | <0.005% | 5.66% |
| Comparative example 4 | 3.96 mg/g | 36.5% | 93.3% | 0.01% | 0.23% |

Porosity measurement: taking about 100 mL of adsorbents and put the same into 200 mL of measuring cylinder, adding water until the adsorbent is saturated by water adsorption, using filter paper to absorb the surface overflow water after ultrasound, and recording the water adsorption volume $V_0$, then continuing to add water to the scale of 250 mL, and recording the water make-up volume $V_1$, then the porosity $\Phi=V0/(250-V1)\times100\%$;

Strength Evaluation of Adsorbent Precursor:

weighing 5 g molded membranous lithium ion sieve precursor dried to constant weight and putting it into a test tube containing distilled water for sealing, putting the above test tube into an ultrasonic oscillator 40 KHZ and oscillating it for 30 min, and then taking it out; after suction filtration and drying to constant weight, weighing the mass mi of the lithium ion sieve precursor (i=1, 2, 3, weighed by the analytical balance), and then repeating three times to take the average value, calculating its average mass loss rate $\Phi_m$:

$$\Phi_m = (m_1 - 2 + m_2 - 2 + m_3 - 2)/5 \times 2 \times 100\%;$$

Experiment 3—lithium precipitation mother liquor adsorption experiment: weighing 50 g granular lithium ion sieve prepared in Embodiment 25, soak it in 2 L of 1700 mg/L lithium precipitation mother liquor, taking the first water sample after 2 h to test the lithium content, and then taking samples every 1 h to test the lithium content, until there is no difference in the lithium content between the two adjacent samples, considering that the adsorption reaches saturation, and calculating the saturated adsorption capacity of the lithium ion sieve. The specific test results are as shown in the following table.

| Adsorbent | 2 h lithium adsorption capacity | Elution rate | Saturated adsorption time | Saturated adsorption capacity | Porosity |
|---|---|---|---|---|---|
| Embodiment 24 | 18.8 mg/g | 99.8% | 4 h | 26.8 mg/g | 78.8% |
| CN112871127A | 12.7 mg/g | 99.1% | 6 h | 18.2 mg/g | 12.52% |

Experiment 4—Example of Preparing Absorbent with Good Suspension Performance

The preparation process is the same as that in Embodiment 23, but the difference is that, the prepared adsorbent contains 60% of effective powder, 2.5% of additive polymer mixture, and 37.5% of composite polymer. The particle size range of the prepared granular adsorbent is 0.3-2 mmm, and the particle size distribution is 0.3-0.5 mm accounting for 15%, 0.5-0.7 mm accounting for 15%, 0.7-0.9 accounting for 30%, 0.9-1.1 mm accounting for 20%, 1.1-1.5 mm accounting for 10%, and 1.5-2 mm accounting for 10%. The average bulk density is 0.35 g/cm$^3$. The granular adsorbent can be suspended and dispersed in the simulated brine with a density of 1.2 from bottom to top, and can be suspended and dispersed in the eluate at a gas flow rate of 0.1 Bv/min. The evaluation results of 0.1 Bv/min bubbling dynamic adsorption are as follows:

| Brine | 0.5 h lithium adsorption capacity | Li recovery rate | 1 h elution rate | Solution loss |
|---|---|---|---|---|
| Simulated brine 1 | 7.0 mg/g | 97.1% | 99.1% | <0.005% |
| Simulated brine 2 | 15.5 mg/g | 97.3% | 99.1% | 0.005% |

It can be seen from the above table that, the granular ion sieve adsorbent prepared by the present invention has good adsorption performance, and the absorbent materials with different suspension properties can be obtained by adjusting the proportion of polymers in the formula and the particle size distribution of molded adsorbent, so as to use different brine and lithium-containing solutions, which has high industrial application value.

Note: The proportions % of titanium loss, elution rate and recovery rate are calculated (mass ratio) according to industry standard formula.

The aforementioned basic example of the present invention and its further selection examples can be freely combined to form multiple embodiments, which can be adopted and claimed by the present invention. In the solutions of the present invention, each selection example can be arbitrarily combined with any other basic example and selection example. Those skilled in the art know that there are many combinations.

All above are only preferred embodiments of the present invention, which do not limit the scope of the present invention. All alterations, equivalent replacements and improvements, without departing from the spirit and principle of the present invention, shall fall into the protection scope of the present invention.

The invention claimed is:

1. A preparation method for a high-adsorption-capacity granular titanium-based lithium ion sieve adsorbent, characterized by comprising the following steps:

step 1, preparing titanium-based lithium ion sieve precursor powder by step a or step b;

a) well mixing a lithium source, titanium dioxide and dispersant by mechanical ball milling, controlling the molar ratio of Li/Ti to be 2: (1-1.2), adding high-temperature pore-forming agent and mixing well, then spray drying to obtain granulation powder, transferring the granulation powder to a microwave high-temperature sintering furnace, calcining at 350-650 °C for 2-3 h, cooling to obtain titanium-based lithium ion sieve precursor powder;

or b) mixing a titanium source, lithium hydroxide and appropriate amount of water, controlling the molar ratio of Li/Ti to be 2: (1-1.2), adding 0.5-1.5 wt % hydrogen peroxide, performing stirring reaction for 3-6 h under 60-90 °C ultrasonic conditions, filtering and scrubbing in sequence, adding high-temperature pore-forming agent, mixing well, and then spray drying to obtain granulation powder, transferring the granulation powder to a microwave high-temperature sintering furnace, calcining at 300-500 °C for 2-3 h, cooling to obtain titanium-based lithium ion sieve precursor powder;

step 2, preparing a high-adsorption-capacity titanium-based lithium ion sieve adsorbent:

A) pretreatment: grinding the titanium-based lithium ion sieve precursor powder and sieving by 150-800 meshes to obtain pretreated powder;

B) preparation of a composite adhesive: dissolving a polymer material with organic solvent, and stirring under a water bath condition of 20-80 °C until completely dissolved to obtain the composite adhesive;

C) doping and blending: mixing the pretreated powder in step A) with the composite adhesive prepared in step B), stirring at high speed and dispersing evenly to obtain uniform slurry;

D) molding: molding the uniform slurry in step C) by granulation—water bath solidification or granulation—vacuum drying, collecting and sieving 0.3-2 mm particles to obtain granular titanium-based lithium adsorbent precursor;

E) elution and replacing: leaching out lithium ions from the granular titanium-based lithium adsorbent precursor in step D) with an eluent, and then washing with water to obtain the high-adsorption-capacity titanium-based lithium ion sieve adsorbent.

2. The preparation method according to claim 1, characterized in that, the dispersant in step a is one of glucose, citric acid or PEG200-PEG6000 aqueous solution with a solution concentration of 1%-2 wt %, and the lithium source is lithium hydroxide or lithium carbonate.

3. The preparation method according to claim 1, characterized in that, the titanium source in step b is metatitanic acid or titanium dioxide, with a primary particle size of 10-50 nm; the specific surface area is 60~400 m$^2$/g, the addition amount of the water is 20%-50 wt % of the solid mass, and the frequency range used for the ultrasound is 20 KHZ-80 KHZ.

4. The preparation method according to claim 1, characterized in that, the spray drying temperature in step 1 is 160-220 °C, the high-temperature pore-forming agent is any one of polyethersulfone, polysulfone and polyarylsulfone, and the titanium-based lithium ion sieve precursor powder obtained is $Li_4Ti_5O_{12}$ or $Li_2TiO_3$.

5. The preparation method according to claim 1, characterized in that, the organic solvent in step B is any one of dimethylacetamide, N-methylpyrrolidone, dimethyl sulfoxide and dichloromethane.

6. The preparation method according to claim 1, characterized in that, the polymer material in step B is any one or a mixture of polyarylsulfone, polysulfone, polyethersulfone, sulfonated polysulfone, polyphenylene sulfone, polyimide, chlorinated polyvinyl chloride and polyvinyl butyral, and the mass concentration of the polymer material dissolved in organic solvent is 5-20 wt %.

7. The preparation method according to claim 1, characterized in that, further comprising adding an additive in step B, the additive is any one or a mixture of polyvinyl alcohol, glycerin, polysulfone, polyarylsulfone, citric acid, glucose, chitosan, oxalic acid, acetic acid, PVP, PEG6000, lithium carbonate, sodium bicarbonate, potassium carbonate, and potassium bicarbonate; an amount of the additive is 3 wt % or less of the mass of the high-adsorption-capacity titanium-based lithium ion sieve adsorbent.

8. The preparation method according to claim 1, characterized in that, in step C, after the pretreated powder is mixed with the composite adhesive, a solid content of the pretreated powder to the composite adhesive is controlled to be 30%-60 wt %; the rotation speed of the high-speed stirring is 1,000-2,500 r/min, and the uniform slurry is sieved by 80-400 meshes.

9. The preparation method according to claim 1, characterized in that, a coagulation bath used for molding by the granulation-water bath solidification in step D is any one of water and inorganic salt solution, and the mass concentration of inorganic salt solution is 0.5%-5 wt %.

10. The preparation method according to claim 1, characterized in that, the eluent in step E is any one of sulfuric acid, nitric acid, hydrochloric acid, acetic acid, citric acid, oxalic acid and $Na_2S_2O_6$.

11. The preparation method according to claim 1, characterized in that, the granulation in molding by the granulation—water bath solidification includes slurry electrostatic spray granulation, slurry brush-stipple spray granulation and disk centrifugal granulation, and the solid content in the uniform slurry must be controlled to be 35%-45 wt %; wherein, the uniform slurry used for electrostatic spray granulation is sieved by 250-400 meshes, with a nozzle aperture of 0.7-1.1 mm, an electrostatic pressure of 3 KV-6 KV, and a distance of 0.3-1 m from a nozzle to receptor fluid; the uniform slurry used for brush-stipple spray granulation is sieved by 150-300 meshes, with a nozzle aperture of 0.9-1.2 mm and a distance of 0.5-1.2 m from a nozzle to receptor fluid; the uniform slurry used for disk centrifugal granulation is sieved by 80-150 meshes, with a disk diameter of 40 mm-80 mm, disk speed of 800 r/min-1200 r/min and a distance of 0.5-1.5 m from a disk to receptor fluid.

12. The preparation method according to claim 1, characterized in that, molding by granulation—vacuum drying needs to first control the solid content in the uniform slurry to be 45%-60 wt %; a vacuum degree range is 0.03 Mpa-0.09 Mpa, a drying temperature is 40-80 °C, and the sieving particle size is 0.5-2 mm.

* * * * *